United States Patent
Bohlin et al.

(10) Patent No.: US 9,197,751 B2
(45) Date of Patent: Nov. 24, 2015

(54) RULES-BASED COMPLIANCE SYSTEM

(71) Applicant: Genesys Telecommunications Laboratories, Inc., Daly City, CA (US)

(72) Inventors: Christopher W. Bohlin, Wellesley, MA (US); John P. Keyes, Lexington, MA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

(21) Appl. No.: 14/225,494

(22) Filed: Mar. 26, 2014

(65) Prior Publication Data
US 2015/0281452 A1 Oct. 1, 2015

(51) Int. Cl.
H04M 3/00 (2006.01)
H04M 5/00 (2006.01)
(Continued)

(52) U.S. Cl.
CPC ............... *H04M 3/523* (2013.01); *H04M 3/51* (2013.01); *H04M 2203/40* (2013.01); *H04M 2242/18* (2013.01); *H04M 2250/60* (2013.01)

(58) Field of Classification Search
CPC ........ G06Q 10/06; H04M 3/323; H04M 3/36; H04M 3/4285; H04M 3/42195; H04M 3/493; H04M 3/51; H04M 3/5166; H04M 3/5175; H04M 3/5183; H04M 3/523; H04M 3/5231; H04M 3/5232; H04M 3/5233; H04M 3/5237; H04M 3/5238; H04M 2203/2011; H04M 2203/2061; H04M 2242/00; H04M 2242/08; H04M 2242/12

USPC ............ 379/265.01, 265.02, 265.03, 265.04, 379/265.05, 265.06, 265.07, 265.08, 379/265.09, 265.1, 265.11, 265.12, 265.13, 379/265.14, 266.01, 266.02, 266.03, 379/266.04, 266.05, 266.06, 266.07, 379/266.08, 266.09, 266.1
See application file for complete search history.

(56) References Cited

U.S. PATENT DOCUMENTS 6,144,944 A * 11/2000 Kurtzman et al. ......... 705/14.54
8,270,575 B2 9/2012 Segall et al.
(Continued)

FOREIGN PATENT DOCUMENTS

JP 2006-013660 A 1/2006

OTHER PUBLICATIONS

"SoundBite Communications to Explore TCPA Compliance Issues at Collections and Credit Risk Conference," Soundbite Communications, Inc., Press Release, Oct. 26, 2011.
(Continued)

*Primary Examiner* — Khai N Nguyen
(74) *Attorney, Agent, or Firm* — Christie, Parker & Hale, LLP

(57) ABSTRACT

A rules-based compliance system enables a permitted user to define one or more contact attempt suppression rules, wherein each contact attempt suppression rule is adapted to be triggered when a configurable number of past contact attempts as defined in the contact attempt suppression rule have been attempted. A set of contacts are then received by the system. During a communications campaign, and before being issued, a contact in the set of contacts is compared against each of the one or more contact attempt suppression rules. The compliance system is then operative to suppress at least one contact based on a result of the comparison that indicates that a given one of the one or more contact attempt suppression rules is satisfied for the contact. A user may also provision one or more contact location rules that suppress contacts based on location information.

20 Claims, 10 Drawing Sheets

(51) Int. Cl.
*H04M 3/523* (2006.01)
*H04M 3/51* (2006.01)

(56) References Cited

U.S. PATENT DOCUMENTS

| | | | |
|---|---|---|---|
| 8,379,834 B2 | 2/2013 | Segall et al. | |
| 8,462,918 B2 | 6/2013 | Segall et al. | |
| 2001/0046282 A1 | 11/2001 | Bailey, II | |
| 2002/0006193 A1* | 1/2002 | Rodenbusch et al. | 379/266.01 |
| 2004/0179672 A1 | 9/2004 | Pagel et al. | |
| 2005/0278443 A1* | 12/2005 | Winner et al. | 709/224 |
| 2006/0147026 A1 | 7/2006 | Statham et al. | |
| 2006/0212355 A1* | 9/2006 | Teague et al. | 705/14 |
| 2007/0172050 A1* | 7/2007 | Weinstein et al. | 379/266.07 |
| 2008/0059283 A1* | 3/2008 | Hansen et al. | 705/10 |
| 2008/0109480 A1* | 5/2008 | Brophy et al. | 707/104.1 |
| 2008/0118050 A1* | 5/2008 | Rodenbusch et al. | 379/265.02 |
| 2011/0123005 A1* | 5/2011 | Segall et al. | 379/88.13 |
| 2011/0123016 A1* | 5/2011 | Segall et al. | 379/266.07 |
| 2011/0246308 A1 | 10/2011 | Segall et al. | |
| 2013/0226677 A1 | 8/2013 | Segall et al. | |
| 2014/0247933 A1* | 9/2014 | Soundar | 379/211.02 |
| 2014/0270107 A1* | 9/2014 | Watson | 379/88.01 |

OTHER PUBLICATIONS

"SoundBite Communications Enhances Compliance Suite for Contact Centers," Soundbite Communications, Inc., Press Release, Nov. 13, 2012.
"SoundBite Enables Compliance and Mitigates Risk in Contact Centers," Soundbite Communications, Inc., Data Sheet, 2012.
International Search Report and Written Opinion for PCT/US2015/022844, dated Jun. 29, 2015, 13 pages.

* cited by examiner

Enterprise Account

Attempts Definition

For the purpose of Do Not Contact Attempt Rules, contact attempts include:

☒ Voice: Busy

☒ Voice: Not Connected

☒ Text: Failed Message

☒ Email: Failed Message

Cancel  Save

Account

Attempts Definition

For the purpose of Do Not Contact Attempt Rules, contact attempts include:

☐ Voice: Busy

☐ Voice: Not Connected

☒ Text: Failed Message

☒ Email: Failed Message

FIG. 8

```
<?xml version="1.0" encoding="UTF-8" standalone="yes"?>
<compliancerules>
    <rules type="ContactAttempt">
        <rule name="xyz" required = "false" priority="1">
            <attribute name="level">
                <value>Enterprise</value>
            </attribute>
            <attribute name="type">
                <value>ClientId</value>
            </attribute>
            <attribute name="numberOfAttempts">
                <value>1</value>
            </attribute>
            <attribute name="numberOfDays">
                <value>1</value>
            </attribute>
            <attribute name="passTypes">
                <value>Dialer</value>
                <value>Voice</value>
                <value>Text</value>
            </attribute>
            <attribute name="direction">
                <value>Outbound</value>
            </attribute>
            <attribute name="regions">
                <value>US:MA</value>
                <value>US:NJ</value>
                <value>US:RI</value>
            </attribute>
            <attribute name="completionStatus">
                <value>All</value>
            </attribute>
        </rule>
    </rules>
</compliancerules>
```

FIG. 9

```xml
<?xml version="1.0" encoding="UTF-8" standalone="yes"?>
<compliancerules>
    <rules type="Contact">
        <rule name="tzrule1" required="true" priority="2">
            <attribute name="type">
                <value>Device</value>
            </attribute>
            <attribute name="passTypes">
                <value>Dialer</value>
                <value>Preview</value>
            </attribute>
            <attribute name="areaCodes">
                <value>617</value>
                <value>781</value>
                <value>207</value>
            </attribute>
        </rule>
        <rule name="regionrule" required="false" priority="3">
            <attribute name="type">
                <value>Device</value>
            </attribute>
            <attribute name="passTypes">
                <value>Text</value>
            </attribute>
            <attribute name="regions">
                <value>US-MA</value>
            </attribute>
        </rule>
    </rules>
</compliancerules>
```

FIG. 10

RULES-BASED COMPLIANCE SYSTEM

BACKGROUND OF THE INVENTION

1. Technical Field

This disclosure relates generally to managing interactive communication campaigns over a computer network, such as the Internet.

2. Description of the Related Art

It is known to provide a web-based hosted solution through which business entities create and manage interactive or notification communications campaigns. An example of an interactive communications campaign is a telephone campaign to determine whether a target recipient desires to transfer a credit card balance to a new account, a campaign to remind a recipient that a credit card payment is due and to offer the recipient an opportunity to speak with a customer representative concerning any payment issues, or the like. Examples could also include communications via email message, SMS message, or web page, or some combination. The hosted solution typically is implemented as an application (or "managed") service provider. One or more business entities ("clients") that desire to use the service typically register and access the service through an on-line (e.g., web-based) portal. In one representative use scenario, the managed service provider entity provides outbound telemarketing services on behalf of participating clients. The campaign typically is provisioned by the client. Thus, for example, using a web-based interface, a participating client defines a script for the campaign, imports a set of contacts (typically, the client's actual customers), and defines one or more parameters that govern how the campaign is to be run. At a designated time, the service provider initiates the campaign, e.g., by providing the contacts to a set of telephone servers that set-up and manage the telephone calls (or SMS, or emails, as the case may be) to the targets of the campaign. During a given outbound call, as noted above, a recipient (a "customer") may be afforded an option to connect to a contact center, e.g., to speak to a customer representative. In such implementations, the hosted solution typically is integrated directly with the contact center's on-premises or cloud-based automatic call distributor (ACD).

As mentioned above, one common use scenario for a platform as described above is to provide for a scalable (e.g. cloud-based) solution that enables companies to maximize contacts and payments, while minimizing risks and costs. To this end, the platform may be used to enable payment reminders, self-service payments, expedited payments, cross-channel collections, and the like. While the platform provides significant advantages in this regard, exposure to compliance risk is at an all-time high. Contact centers are operating in an uncertain and tightening national and local regulatory environment, increasing the cost and complexity of doing business. At the same time, consumers are filing lawsuits at a record pace, many times resulting in organizations paying hefty fines.

A well-implemented hosted solution such as described above can help contact centers mitigate risk by providing tools and mechanisms that facilitate compliance while mitigating risks. For example, one known solution, Genesys® Engage™ (formerly Soundbite® Compliance Suite for Contact Centers), prevents prohibited numbers from being contacted, ensures agents adhere to regulatory or other requirements, controls contact frequency, keeps-up with consumer mobility and phone portability, and enables effective management of consumer consent. While a solution of this type provides significant advantages, compliance requirements, such as FDCPA, TCPA, FCRA, PCI DSS, GLBA, HIPAA, EDPD, UK Data Protection Act, among others, are complex, broad-reaching and ever-changing. A platform that provides a comprehensive compliance solution must help customers (potentially operating across a variety of industries) to manage compliance and adapt their strategies as new demands are imposed from regulatory agencies (e.g., the FCC, FTC CFPB, CRTC and others) at all government (Federal, State, and international) levels.

BRIEF SUMMARY

A web-based hosted solution through which business entities create and manage communications campaigns is enhanced to include a compliance manager by which authorized users create, manage and enforce compliance rules that cause contact attempts to be suppressed. Preferably, there are two basic types of rules: "contact attempt" rules, and "contact location" rules. Generally, contact attempt rules suppress contact attempts based on a history of previous attempts to each contact, and contact location rules suppress contact attempts based on the location of each contact. These rules may be implemented separately or together. Preferably, each contact is evaluated and (if necessary) suppressed just before the communication (e.g., call, SMS, MMS, email, video, social media, etc.) is attempted. In one embodiment, a rule may be "required" or "optional." Required rules are always applied to every sub-campaign within the enterprise or account; in addition, preferably enterprise-level rules are available to (or applied to, if required) all accounts within an enterprise, and account-level rules are available or applied to each individual account. Optional rules may be chosen by the user on the campaign template or the sub-campaign settings. Preferably, each rule has a "priority," and the priority value controls the order in which rules are executed. A user interface provides the user the ability to create a rule, edit a rule, copy a rule from an existing rule, delete a rule, re-order rule priority, add and remove rules from sub-campaigns and campaign templates, and the like.

In one embodiment of a rules-based compliance system, a permitted user defines one or more contact attempt suppression rules, wherein each contact attempt suppression rule is adapted to be triggered when a configurable number of past contact attempts as defined in the contact attempt suppression rule have been attempted. A set of contacts are then received by the system. During a communications campaign, and before being issued, a contact in the set of contacts is compared against each of the one or more contact attempt suppression rules. The compliance system is then operative to suppress at least one contact (assuming a rule is fired) based on a result of the comparison that indicates that a given one of the one or more contact attempt suppression rules is satisfied for the contact.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

FIG. 3 is a representative display interface of a set of "Do Not Contact Attempt" rules that are provisioned to suppress contact attempts according to a first embodiment;

FIG. 4 is a representative display interface of a set of "Do Not Contact Location" rules that are provisioned to suppress contact attempts according to a second embodiment;

FIG. 6 is a representative display interface by which a permitted user configures a new contact location rule;

FIG. 7 is an alternative display interface by which a permitted user configures a new contact attempt rule;

FIG. 8 is a display interface by which a permitted user configures a definition of an "attempt" that is counted according to a configured rule;

FIG. 9 illustrates a representative XML code snippet for a configured new contact attempt rule;

FIG. 10 illustrates a representative XML code snippet for a configured new contact location rule.

DETAILED DESCRIPTION

Figure 1:
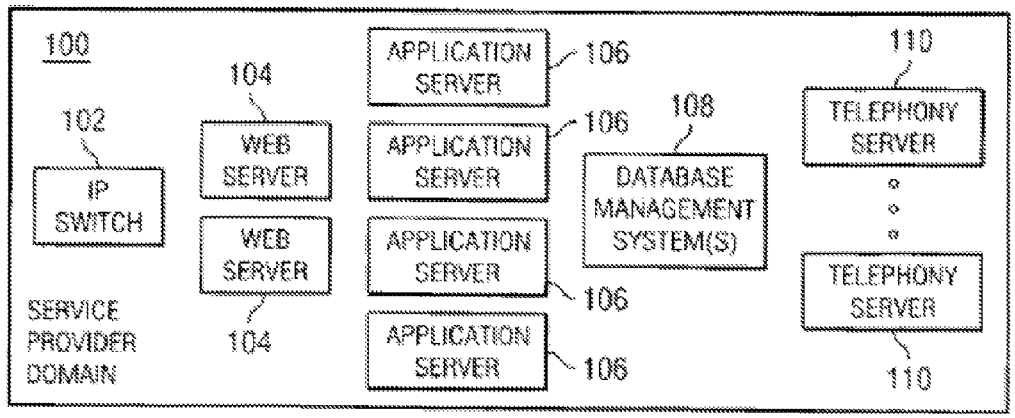
FIG. 1 is a block diagram of a service provider infrastructure for implementing a managed communications campaign service and in which the subject matter of this disclosure may be implemented.

The technique herein may be used by a service provider that enables personalized, multi-channel customer communications. FIG. 1 illustrates a representative service provider or system architecture of this type. The approach is not limited for use with a service provider that provides customer communications, as it may also be implemented by other entities. Thus, for example, the functionality may be implemented at an enterprise level (e.g., by a large enterprise with various business units).

The service provider architecture typically is implemented in or across one or more data centers. A data center typically has connectivity to the Internet. Generally, and as well-known, the system provides a web-based hosted solution through which business entities create and manage communications campaigns. Campaigns may be interactive or non-interactive, outbound and/or inbound. An outbound campaign is one in which communications are initiated from the service provider to end users. An inbound communication typically involves a customer calling a contact center, or the like. Representative outbound campaigns include, without limitation, account renewal campaigns, balance transfer or consolidation offer campaigns, billing issue campaigns, credit card activation campaigns, fraud alert campaigns, payment or past due reminder campaigns, phone or customer survey campaigns, debt recovery campaigns, late payment with right party verification campaigns, payment reminder with direct connect to call center campaigns, appointment reminder campaigns, welcome call campaigns, account renewal campaigns, affinity cross-sell/rewards program campaigns, crisis management/disaster recovery campaigns, new product offer campaigns, inquiry/web follow-up campaigns, contract renewal campaigns, service availability notification campaigns, promotional offer campaigns, service delivery confirmation campaigns, auto-responder campaigns, trivia/sweepstakes campaigns, marketing alert campaigns, and the like. The particular type of campaign is not a limitation or feature of the disclosed subject matter.

In a well-known operation, a business entity (a "client") user has a machine such as a workstation, notebook or laptop computer, tablet or other mobile device. Typically, a business entity user accesses the service provider architecture by opening a web browser on the machine to a URL associated with a service provider domain. (In an alternative, the client may operate its own dedicated client application in lieu of a web browser to access a server side of the application.) Access may also be through an automated process, such as via a Web services application programming interface (API). Where a web browser is used, the client authenticates to the managed service in the usual manner, e.g., by entry of a username and password. The connection between the business entity machine and the service provider infrastructure may be encrypted or otherwise secure, e.g., via SSL, or the like. Although connectivity via the publicly-routed Internet is typical, the business entity may connect to the service provider infrastructure over any local area, wide area, wireless, wired, private or other dedicated network. As seen in FIG. 1, the service provider architecture 100 comprises an IP switch 102, a set of one or more web server machines 104, a set of one more application server machines 106, a database management system 108, and a set of one or more telephony server machines 110. A representative web server machine 104 comprises commodity hardware (e.g., Intel-based), an operating system such as Linux, and a web server such as Apache 2.x. A representative application server machine 106 comprises commodity hardware, Linux, and an application server such as WebLogic 9.2 (or later). The database management system 108 may be implemented as an Oracle (or equivalent) database management package running on Linux. A representative telephony server machine is an application server that implements appropriate software applications for call set-up, voice processing, and other call connection and management activities. An application may implement the Media Resource Control Protocol (MRCP). In the alternative, a telephony server machine may execute an application server in conjunction with one or more PSTN, VoIP and/or voice processing cards that provide interconnectivity for telephone-based calling applications. In a card-based embodiment, a representative card is a CG 6565 (or variant) series available from Dialogic, or an equivalent. Typically, a voice processing application port or card has a finite number of supported ports. In a high volume call environment, there may be several web server machines, several application server machines, and a large number of telephony server machines. Although not shown in detail, the infrastructure may include a DNS name service, FTP servers, MRCP (Media Resource Control Protocol) servers, load balancing appliances, other switches, and the like. Each machine typically comprises sufficient disk and memory, as well as input and output devices. The software environment on each machine includes a Java virtual machine (JVM) if control programs are written in Java. Generally, the web servers 104 handle incoming business entity provisioning requests, and they export a management interface that is described in more detail below. The application servers 106 manage the basic functions of generating campaign scripts, managing contacts, and executing campaigns. The telephony servers 110 handle most telephony-related functions including, without limitation, executing outbound calls and forwarding calls to a contact center. The particular hardware and software implementation details described herein are merely for illustrative purposes are not meant to limit the scope of the present invention. Indeed, the approach herein may be virtualized in whole or in part using cloud resources, SDN, NFV, and the like.

In a representative embodiment, a typical machine in the service infrastructure is a processor-based server running Linux, and the server includes a telephone interface. A typical interface has up to 200 ports, and each port may be considered a separate telephone line. There are typically a set of such servers operating at a given location (e.g., an Internet data center). The following is a typical operation of the service. Using a Web browser or the Web service API, a client provisions a campaign, provisioning a script to be played to a target customer. The scope and content of the script will depend on the campaign. The client also provides the service provider with contact information for a set of persons, who are the target recipients of the campaign. In operation, the system batches a subset of those contacts to one of the machines in the server farm.

Using the service provider infrastructure, a business entity can create, execute and manage a campaign. As noted above, a campaign may have associated therewith one or more "sub-campaigns." Using a Web interface, a client loads a list of contacts who will be called and associates that list with a script. A "sub-campaign" refers to one or more passes through a contact list that has been bound to a script and that has been associated with a given timeframe. Thus, a "sub-campaign" associates at least the following items: a list of contacts, a script, and a timeframe. Additional details regarding sub-campaigns are set forth below. A script determines what will happen during a phone call or SMS conversation. Typically, a script is formatted as XML and specifies a sequence of audio prompts that are played and what happens when the recipient takes certain actions such as pressing a button on the phone or speaking a response. One or more contact lists are stored in a contact database, and typically a contact list comprises a set of contacts. A contact typically is an individual in the contact database, and this individual is sometimes referred to as the "customer" (as, technically, the individual is a customer of the client using the managed service). A contact can include home, work or cell numbers, a client identifier, an email address, or the like. Also, contacts typically include first name, last name, company and other information.

Figure 2A:
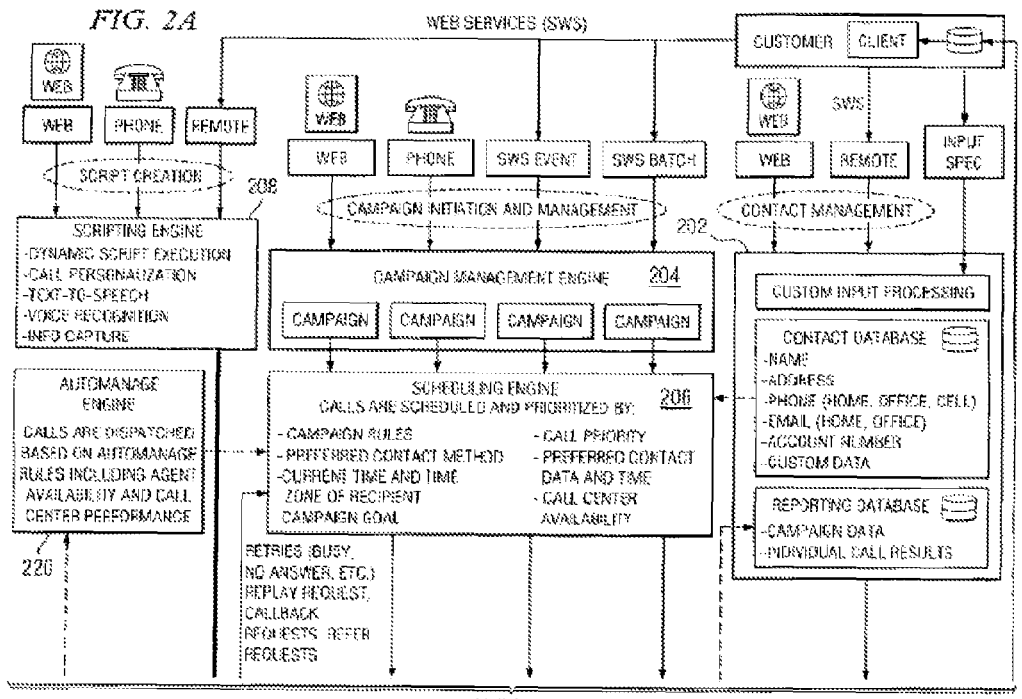
FIGS. 2A-2B illustrate how an interactive communications campaign is created and managed in the service provider infrastructure illustrated in FIG. 1.
Figure 2B:
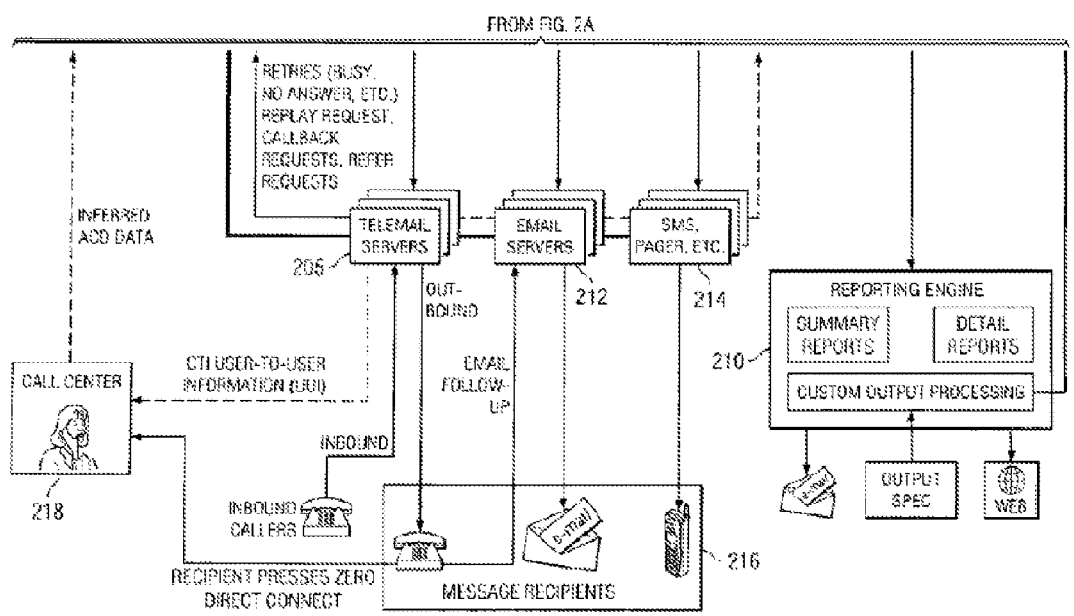

With reference to FIGS. 2A-2B, and as described above, a business entity connects to the service provider, authenticates, and then uses one or more applications to create, execute and manage the campaign. These applications execute on the application server machines and operate in association with one or more databases that are supported within the database management system. These applications include, for example, a contact management application 202, a campaign management engine 204, a scheduling engine 206, and a scripting engine 208. The contact management application 202 handles the receipt and storage of the contact list(s) uploaded (e.g., via FTP or otherwise) to the system by or on behalf of the business entity client. The scripting engine 208 handles the creation and managing of the campaign scripts, using instructions entered by or on behalf of the business entity client via a web-based interface or Web services API. The campaign management engine 204 manages the campaign by interoperating with the scheduling engine 206, which in turn interoperates with the telephony servers 205 to execute the campaign. The business entity client evaluates or monitors the campaign from summary, detail and/or custom reports generated by a reporting engine application 210. Campaign evaluation and monitoring may also be performed via a Web-based user interface, or in an automated manner via an API. Notification campaigns are executed using email servers 212 and SMS (or MMS) servers 214, or by other means, such as by telephone. Of course, SMS campaigns may involve more than notifications and may be interactive. This is also the case for Web-based interaction.

As also illustrated in FIGS. 2A-2B, after connecting an outbound call to a target customer 216, the customer may elect to be connected to the contact center 218 (typically a third party call center) or the system may perform that direct connect automatically once it determines that a human being (as opposed to an answering machine) has answered the outbound call. The system typically obtains information about the contact center's performance during a given communications campaign, commonly without requiring a direct connection between the infrastructure and a contact center's on-premises ACD. This enables the managed service provider to integrate with both its business entity clients and with their associated contact center environments rapidly and efficiently. The interconnectivity between the managed service provider and the contact center may be "inferred" from how calls that originate from the service provider to the target recipients (who have expressed an interest in being connected to the contact center) are actually handled. This connectivity is provided by the control engine 220, which is responsible for dispatching calls at an appropriate rate while ensuring that all customer-requested rule parameters are honored.

As noted above, preferably a web-based interface is provided to enable a business entity client to create a set of one or more management rules that, when triggered during the campaign, cause the infrastructure (and, in particular, certain control applications therein) to take certain control actions in real-time, preferably based on campaign performance.

A "campaign" refers to an overall series of calls, texts or emails (or some combination thereof in the case of a blended campaign) to a contact list using one or more sub-campaigns that use a given script. Campaigns also act as templates for the sub-campaigns that are created under them. A campaign typically has a preset configuration that applies to all of its sub-campaigns. As noted above, a "sub-campaign" refers to one or more passes through a contact list using a script and that is constrained to a particular timeframe (or at a set of one or more such times). A sub-campaign typically runs under an existing campaign. A "script" as noted above determines what happens during a phone call, SMS conversation, email message, or web-based interaction. Typically, the script specifies a sequence of audio prompts that are played to a client (an end user who receives a call) and what happens (the contact center connection) when the recipient takes certain actions (such as pressing a button on the phone or speaking an answer to a query). The script may also specify other actions, such as effecting a contact center connection automatically when detecting that a human being has answered. The nature and type of actions set forth in a script thus may be quite varied, and this disclosure is not limited to any particular process flow within a script.

The hosted service typically also includes a preference management (PM) module (or platform). The PM system maintains a set of consumer preferences or attributes related to communication and behavior. These include, among many others, opt-in, opt-in date, opt-in method, and opt-in user. The service maintains databases of such opt-in preferences and values. Preferably, consumer preferences are created, maintained and accessed in one of several ways: via a web-based portal, via a voice portal, via an application programming interface (API), or via a mobile or smartphone application. The users of the preference management system typically include, without limitation, a client administrator, a client customer service representative, or the consumer himself or herself (in other words, the client's customers).

To this end, the hosted service typically includes a campaign strategy management (CSM) module. A service customer accesses CSM functionality through a web-based graphical user interface (GUI), via a programmatic interface, or otherwise. The CSM component allows customers to define more granular and specific campaign strategies, including pass escalation for alternative channels (e.g., text and email) and/or based upon attempt results, contact attributes and response group data. The campaign strategy manager allows users to define pass escalation strategies statically and dynamically, to manage lists across multiple campaigns, and to view results in real-time. A defined strategy is a static strategy created by a user for a particular campaign that, once created, typically is not modified. A dynamic strategy is one where, during the course of a day (e.g., as a sub-campaign is running), a user may alter the defined strategy, preferably just for that day (or portion thereof).

A permitted user associated with the customer accesses CSM to develop a campaign or modify an existing campaign. As noted above, a campaign typically includes one or more sub-campaigns, each of which operates on a contact list. List management typically involves a user loading a list into the system (e.g., using web-based tools, FTP upload, or the like) and then dividing the contacts among different campaigns, typically based upon selected contact attributes.

A campaign strategy typically includes one or more components including a name, a script, a skill group, and reporting options. The campaign strategy is a subset of these components, and it typically includes one or more of the following: campaign level filtering; pass pattern; namely, escalation type (none, contact-based, call pass-based and intra-pass device escalation), and number and type of passes (voice, text or email). Each pass itself can include components such as: pass level list filtering, contact accept criteria, delivery timeframe, delivery options, and re-try options.

CSM enables the user to create a single-pass, event-based sub-campaign for each channel of a multi-channel campaign. A channel is one of: voice, text, email, AVM, Web, or some combination. CSM exposes one or more strategy templates that can be pre-populated (offline or external to the runtime system), and then uploaded to the system for execution with respect to a particular campaign. In one embodiment, the strategy template is created in XML, and it defines specific aspects of a campaign strategy including number of passes, contact accept criteria for each pass, delivery timeframe, delivery and re-try options, and filtering options.

One or more functions of a technology platform such as described above may be implemented in a "cloud-based" architecture. Cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications). A cloud-based platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, networking technologies, etc., that together provide the functionality of a given system or subsystem. As described, the functionality may be implemented in a standalone machine, or across a distributed set of machines.

The service provider architecture may be on-premises, cloud-based or hybrid (on-premises and cloud), in whole or in part.

Using a web-accessible set of display interfaces (e.g., one or more web pages with fill-in forms, dropdown menus, and other such controls), the platform enables the user to design campaign strategies and sub-campaigns that contain settings to allow outbound contacts to be filtered, e.g., by state/province, time zone, or other criteria. It may also provide for contact history suppression that allows the user to suppress contact attempts based on previous attempts (from the campaign, account, or enterprise) to a particular contact made within a given time period, e.g., the last 1-30 days. In this known approach, contacts are evaluated and suppressed in bulk at the start of the time zone for a pass.

In one platform, compliance functionality supports the ability to prohibit contact attempts based on: State or province, day of week, time of day, and date (e.g. holidays and other significant dates). In this approach, contacts attempts that would have occurred in any of these locations, or at/on any of these times/dates, are not attempted (suppressed).

Rules-Based Compliance System

The above-described compliance functionality is enhanced according to this disclosure through the use of a new system of compliance rules. Preferably, there are two basic types of rules: "contact attempt" rules, and "contact location" rules. Generally, and as will be seen, contact attempt rules suppress contact attempts based on the history of previous attempts to each contact, and contact location rules suppress contact attempts based on the location of each contact. Typically, compliance rules are rules of exclusion; they cause contact attempts to be suppressed. Preferably, each contact is evaluated and (if necessary) suppressed just before the call/SMS/email is attempted. Preferably, rules are evaluated before making each attempt, and changed rules are evaluated for any new attempts.

In one embodiment, rules are created at an enterprise level (e.g., in the enterprise account) and the account level. Enterprise rules are then available to all accounts in the enterprise. In this approach, account rules are available only to the account in which they exist, although this is not a limitation.

A rule may be "required" or "optional." Required rules are always applied to every sub-campaign within the enterprise or account. Optional rules may be chosen by the user on the campaign template or the sub-campaign settings (much like suppression lists are chosen). Preferably, each rule has a "priority," which is an integer from 1 (highest) to 999 (lowest). The priority controls the order in which rules are executed.

Figure 3:
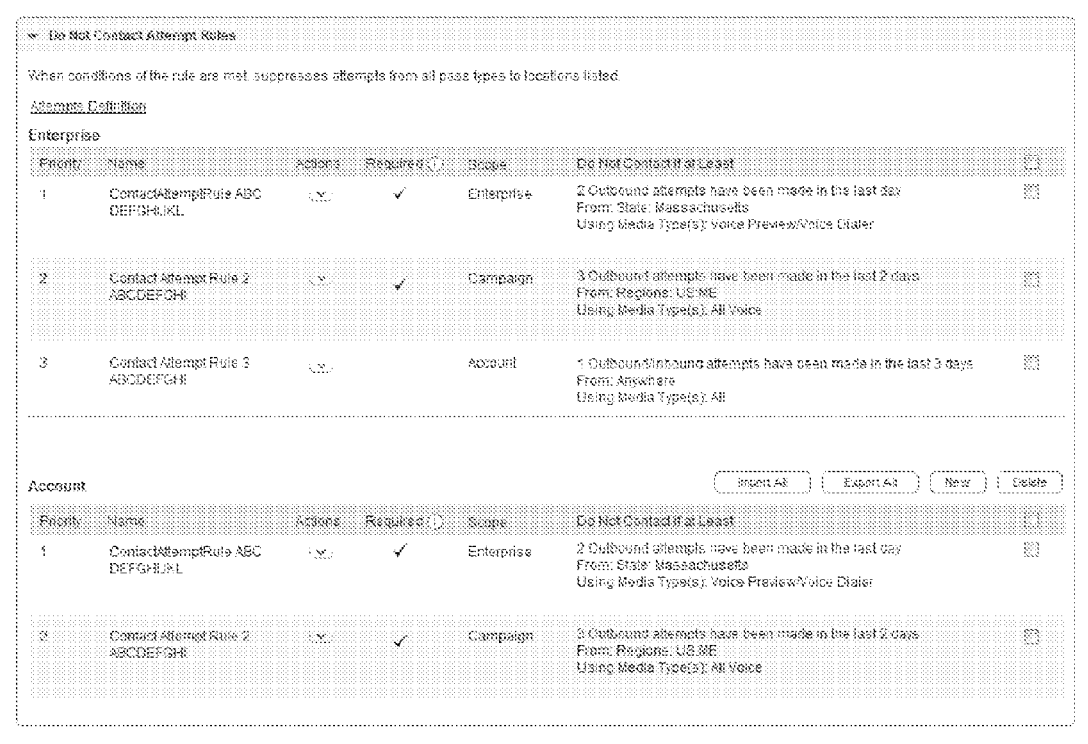

In one example scenario, FIG. 3 is a representative display interface listing a set of "Do Not Contact Attempt Rules" that a user has provisioned. In these examples, when conditions of the rule are met, the system suppresses attempts from all pass types to the location(s) listed in the rule. As illustrated, there are three (3) enterprise-level rules provisioned in the identified priority order. The first two rules are required and the third one is optional. The scope (enterprise, campaign, account) is also identified. The display also identifies two (2) account-level rules also provisioned in the identified order. Thus, in this example, each sub-campaign that is running has some combination of enterprise and account rules in affect (required rules plus any additional rules that are chosen).

Figure 4:
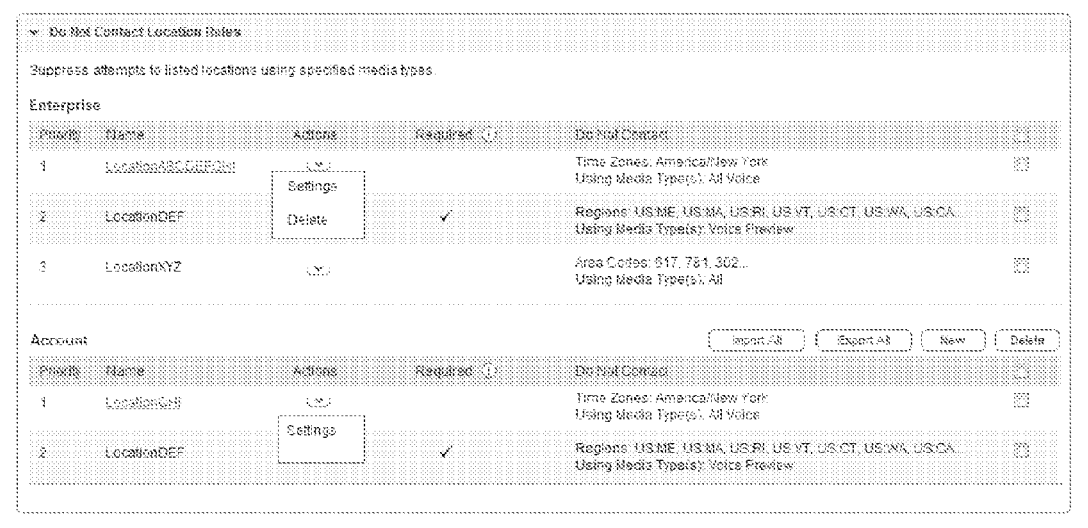

FIG. 4 is a representative display interface listing a set of "Do No Contact Location Rules" that the user has provisioned. The display in FIG. 3 may be provided concurrently with the display in FIG. 4. In this example scenario, there are once again three (3) enterprise-level contact location rules specified in the identified order, and two (2) account-level contact location rules. Of course, the number and type of rules may be varied. Each contact location rule suppresses attempts to the listed locations using specified media types.

During the sub-campaign, and just prior to each contact attempt, these rules are executed against the contact and device, preferably in the following order: enterprise location rules (highest to lowest) (FIG. 4), account location rules (highest to lowest) (FIG. 4), enterprise attempt rules (highest to lowest) (FIG. 3), and account attempt rules (highest to lowest) (FIG. 3). Other sequences may be used. When a rule is triggered, suppression is carried out according to the conditions identified in the applicable rule. Preferably, and for a given attempt, once a rule is triggered, no further rules are evaluated.

Figure 5:
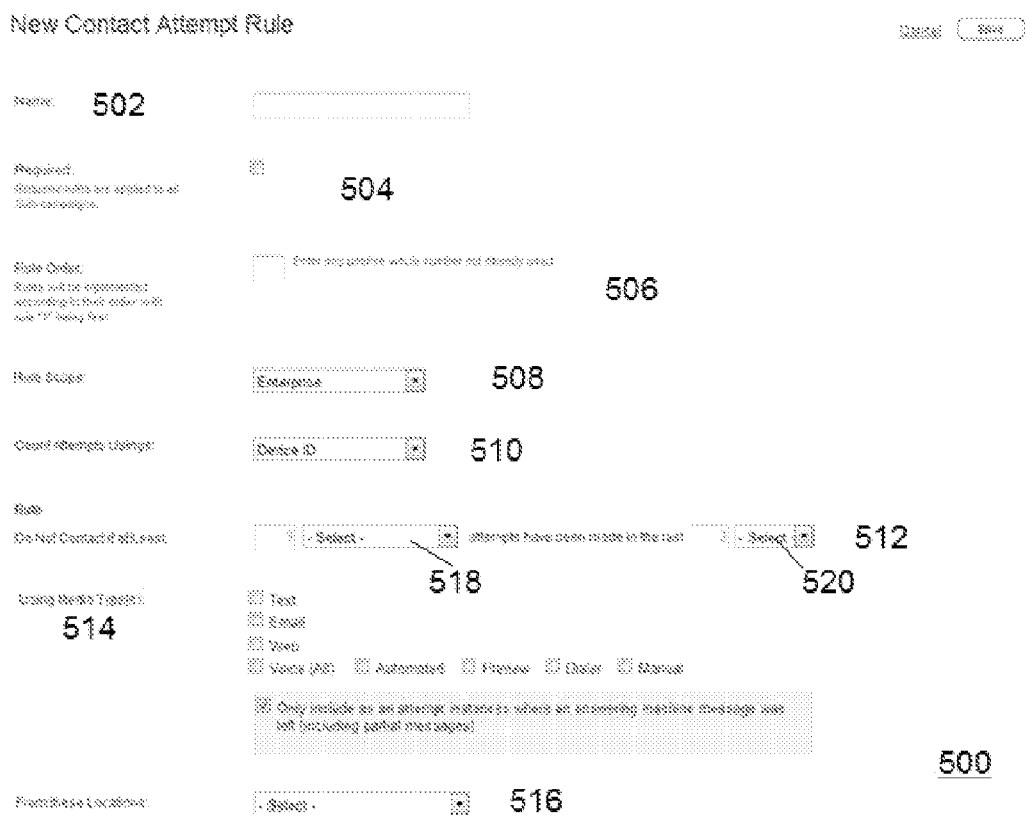
FIG. 5 is a representative display interface by which a permitted user configures a new contact attempt rule.

FIG. 5 illustrates a representative display interface 500 by which a permitted user configures a new contact attempt rule. The rule includes a name field 502, a required checkbox 504, a rule order fill-in box 506, a rule scope dropdown list 508, a count attempts using dropdown list 510, the rule 512, a set of media type checkboxes 514, and a locations dropdown list 516. The name field 502 is filled in with the name of the rule. The required checkbox determines whether the rule is required or optional. The rule order sets a priority value for ordering the rule against other rules. The count attempts using list identifies the device or identifier against which the rule is configured. The rule itself includes the fill-in attempts field 518 (defined as Inbound, Outbound, or both), and a temporal fill-in field 520 (hours, days). When the "both" option is selected, the compliance rule also counts inbound attempts as well when determining whether to suppress. The locations dropdown list identifies the location (e.g., everywhere, countries, time zones, regions, area codes, postal codes, etc.).

Figures 6, 7:
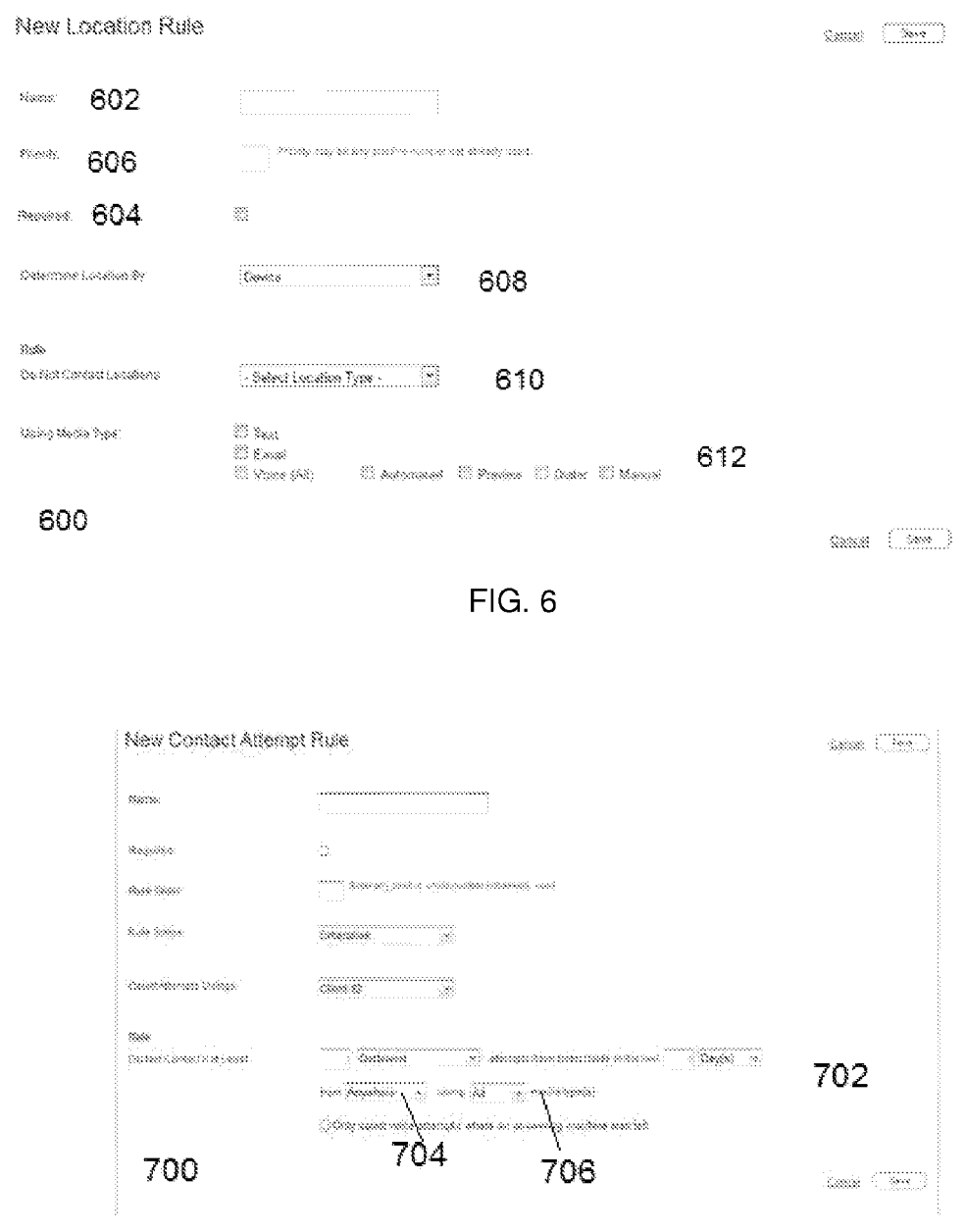

FIG. 6 illustrates a representative display interface 600 by which a permitted user configures a new contact location rule. The rule includes a name field 602, a required checkbox 604, a rule order fill-in box 606, a determine location by dropdown list 608, the rule 610, and a set of media type checkboxes 612. The name field 602 is filled in with the name of the rule. The required checkbox determines whether the rule is required or optional. The rule order sets a priority value for ordering the rule against other rules. The determine location by list identifies the device or identifier against which the rule is configured. The rule itself includes the fill-in location field (e.g., everywhere, countries, time zones, regions, area codes, postal codes, etc.).

The above-described interfaces are merely representative and should not be taken to limit the disclosed subject matter. Other display configurations and ancillary display interfaces may be used. Thus, for example, FIG. 7 illustrates an alternative version of the contact attempt rule configuration interface 700. In this modified version, the rule 702 is configured with the location fill-in field 704 directly, and the media type(s) are identified from a separate dropdown list 706. FIG. 8 illustrates representative interfaces by which the permitted user configures a definition for an "attempt."

Typically, the display interfaces are provided as web pages in a web-accessible configuration interface. The contact attempt and contact location rules may be configured in other ways, e.g., programmatically.

The following sections provide additional details regarding the rules.

Contact Attempt Rules

According to this disclosure, a compliance system provides a permitted user the ability to design and implement "contact attempt" rules. A content attempt rule is based on an "attempt." A contact attempt rule describes some way in which, if the rule is applied to a sub-campaign (or, more generally, a campaign), contact attempts are suppressed, preferably just before they would have been made (as opposed to when the sub-campaign is created or contacts for the time zone have begun). Preferably, the list of rules itself does not cause suppression to occur (aside from "required" rules, as described below). Rather, the list merely provides a list of suppression rules that are available to sub-campaigns.

Preferably, and as noted above, contact attempt rules may be configured as "required" or "optional." Required rules are applied to every sub-campaign in the enterprise or account. Each contact attempt rule describes a suppression scenario, typically for one of the following: Client ID, Device, and Client ID+Device combination. Client ID counts previous attempts to any device on the current contact regarding of which of those devices is currently being attempted. Device counts previous attempts to the current device regardless of what Client ID the previous attempts were associated with. The combination Client ID+Device counts previous attempts to the same ClientID/Device combination as the current attempt. Preferably, each contact attempt rule identifies one or more specific channels (e.g., pass type), or all channels. Preferably, each contact attempt rule has a attempt direction, such as: Inbound, Outbound, or Either. The direction information enables outbound contact attempts to be suppressed based on inbound contacts from a device or contact. Inbound and outbound attempts preferably are tracked separately, but they may be combined for purposes of suppression. This is fill-in field 516 in FIG. 5.

A contact attempt rule preferably is based on either all previous attempts, or only attempts in which an answering machine message was left (whether a complete or partial message was left). A checkbox 515 as shown in FIG. 5 may be selected for this latter purpose.

Preferably, a contact attempt rule enables the following suppression scenarios: "Suppress based at least <n> attempts in the last <m>[hours|days] from the [Campaign|Account|Enterprise] to a [device|Client ID] located in one or more of the following: anywhere, in a specified postal code, in a specified area code (including outside of North America, wherein area codes are determined by geo-data), in a specified device time zone (based on the device telephone number), in a specified contact time zone, in a specified region (e.g. state/province, a contact for a ClientID, a device for a ClientID+device), and in a specified country."

The particular grammar and syntax of a contact attempt rule is not limited to the above-described example.

Of course, the various scenarios that may be implemented may be quite varied, and other constraints (attributes) may be applied within a particular rule. Thus, for example, a user may design a contact attempt rule to include additional constraints, such as "Suppress all attempts in a sub-campaign if there have been at least <n> attempts resulting in a specified [completion status|disposition code|response group|message-level session variable] in the sub-campaign." Another rule may "Suppress all attempts in an account if there have been at least <n> attempts resulting in a specified [completion status|disposition code|response group|message-level session variable] in the last <m> days in the [account|enterprise]." Another rule would be same as the above, except "based on a percentage of the list reaching the specified result instead of <n> attempts." A contact attempt rule may specify that all attempts to any of the above are suppressed, even if there were no previous attempts of any sort. The number "n" in the rule structure may be up to a relatively large value (e.g., 200). In the rule structure shown above, a user can based on previous attempts going back 1 to 23 hours, or 1 to least 31 days (this limit is configurable via a parameter). Preferably, specifying "1 day," for example, should mean "today," as opposed to "the last 24 hours." Preferably, specifying "Today" is based on the time zone of the contact or device being attempted.

Other such "action-based" variants are also contemplated and implemented by the system. Thus, suppression may be carried out based not just on previous attempts made to/from contact recipients, but also based on previous actions taken by contact recipients. For example, a particular rule may enforce suppression if a contact has previously listened to at least a configurable number of seconds of a previous message, or if the user has previously responded in a certain configurable way to a text message, or the like.

A rule may include a list of postal codes, area codes, time zones, regions, or states at one time. Preferably, a user also is able to specify whether each of the following completion statuses should be considered an "attempt" for purposes of contact attempt rules: BUSY (default=not an attempt), NOT_CONNECTED (e.g. SIT) (default=not an attempt), Failed SMS message (default=is an attempt), Failed email message (default=is an attempt). As noted above, a representative interface for this purpose is illustrated in FIG. 8.

The user interface provides the user the ability to configure contact attempt rules as follows: create a rule, edit a rule, copy a rule from an existing rule, delete a rule, re-order rule priority, add and remove rules from sub-campaigns and campaign templates (except that required rules may not be removed). If an existing rule is edited, replaced, or deleted, preferably any sub-campaign in which it is being used is affected immediately, so the user should be warned and required to confirm before the change is applied. Rule additions, changes, and deletions preferably take effect immediately, even for currently running sub-campaigns. An alternative embodiment is to have a rule addition, change or deletion occur conditionally, or depending on some external event. Preferably, deleting a rule does not bring back any contact attempts that have already been suppressed by that rule. Preferably, all changes to contact attempt rules (create, edit, re-order, delete) are logged to the actions log (if the change is associated with a sub-campaign) and an events log for the account (or enterprise account). All changes to contact attempt rules (create, edit, re-order, delete) preferably are logged to an actions log (if the change is associated with a sub-campaign) and the events log for the account (or enterprise account.

Preferably, and as also noted above, a user is provided the ability to control an order or priority of the rules. Rule priority does not affect which contacts will be attempted, but it does affect reporting. Preferably, a highest priority (first) rule that causes a contact not to be attempted is the one that is reported in summary and detail reports. Preferably, no two rules in an enterprise account have same priority, and preferably no two rules in an account have the same priority. Each contact attempt rule has a name. Preferably, no two rules in an enterprise account have the same name, and no two rules in an account have the same name. Preferably, enterprise-level rules are applied in priority order, followed by account-level rules. Preferably, each contact attempt rule has a "report as" value, which will appear as the reason code for the suppression in detail reports. Preferably, more than one rule may have the same "report as" value, thus allowing different compliance rules to be grouped together for reporting purposes.

Preferably, compliance functionality using contact attempt rules is available at both an enterprise and account level. Enterprise users may create suppression rules that are used by all accounts in the enterprise. Account users preferably have access to the enterprise-level rules, but may not be able to edit them. Account users may create suppression rules at the account level; these rules should be available to any user of the account in addition to the enterprise-level rules.

FIG. 9 illustrates a representative XML (Extensible Markup Language) code snippet for a configured contact attempt rule. This code snippet is generated upon receipt of the data (e.g., in the form shown in FIG. 5 or FIG. 7) defining the contact attempt suppression rule. As noted above, each contact attempt suppression rule is adapted to be triggered when a configurable number of past contact attempts (and other specified conditions) as defined in the contact attempt suppression rule have been attempted. The code snippet may be generated programmatically upon entry of the configuration data for the rule. Or, and as an alternative to creating rules via the user interface, the user may create/edit XML rules outside of the system and then load them into the system; this allows users a convenient way to back up rules (to XML files or the like) or to copy (for re-use) rules from one account to another.

Contact Location Rules

As noted above, contact location rules suppress contact attempts using the location of each contact to determine whether to suppress. For example: "suppress all attempts to area codes 617 ad 781," or "suppress all attempts to postal codes FIQQ 1ZZ, TKCA 1ZZ, and BIQQ 1ZZ."

Preferably, each location rule is made up of the following attributes: a rules tag with a type attribute of Contact, e.g., <rules type="Contact">. For example: <rules type="Contact">. Attempt rules are enclosed in a rules tag with a type attribute of ContactAttempt. For example: <rules type="ContactAttempt">. The location rule includes a name attribute; a "required" attribute that either is true (indicating whether the rule is required) or false (indicating that the rule is optional; a priority attribute (1-999), which a unique priority (per account) assigned to each rule within its type (preferably rules that cause the most suppression having the highest priority); a "type" attribute (Device or ClientID), a "passType" attribute (e.g., voice, dialer, manual, preview, text and email) that enables the location rule to be applied to attempts for only a specified channel (or all channels), etc.; and a "location" attribute (e.g., regions, areaCodes, timeZone, countries, PostalCodes, etc.).

Once again, the particular contact location rule may be specified using any syntax or grammar. A single location-related attribute in a rule may contain one or more values. A single location rule may specify more than one different location-related attribute (for example, states and area codes).

FIG. 10 illustrates a representative XML code snippet for a configured location rule. This example is an optional region rule, and it applies only to text. This code snippet is generated upon receipt of the data (e.g., in the form shown in FIG. 6) defining the contact location suppression rule. As noted above, each contact location rule is adapted to be triggered when the location data (and other conditions) as defined in the contact location rule have been met. The code snippet may be generated programmatically upon entry of the configuration data for the rule.

Preferably, contact attempt and location rules are managed from a Compliance page within a Campaigns tab in the enterprise account or a regular account. Rules can be created by loading an XML file of rules via the UI, or they may be individually created via the UI. As noted above, preferably users in a regular account can see enterprise-level rules, but cannot modify or remove them. Loading rules via an XML file preferably causes all existing rules in the account or enterprise account to be removed and replaced entirely by the rules in the XML.

Once the desired rules have been created (in the account, the enterprise account, or both), they are available for use by campaigns. Using compliance rules involves choosing which rules will be applied for a sub-campaign. Preferably, compliance rules can be chosen on the settings for a campaign, as well as for individual sub-campaigns that are created within those campaigns. Any compliance rules chosen for a campaign become the default choices for new sub-campaigns, but of course those choices can be overridden when new sub-campaigns are created.

Preferably, when new "required" rules are created in an enterprise or account, the system is configured to enforce those rules substantially in (or near) real-time including for sub-campaigns that are currently running. Likewise, when a rule is modified or removed, preferably the system enforces that change in (or near) real-time.

As noted above, preferably each sub-campaign that is running has some combination of enterprise and account rules in affect (required rules plus any additional rules that are chosen). Just prior to each contact attempt, these rules are executed against the contact and device, preferably in the following order when both location and contact attempt rules are configured: enterprise location rules (highest to lowest), account location rules (highest to lowest), enterprise attempt rules (highest to lowest), and account attempt rules (highest to lowest). Other sequences may be used. When a rule is triggered, suppression is carried out. Preferably, and for a given attempt, once a rule is triggered, no further rules in the applicable rule set are (or needs to be) evaluated.

If escalation is being used in the sub-campaign, then "Device" type suppression allows the escalation of that contact to continue on to the next device (for contact-based escalation) or contact pass (for contact pass escalation). On the other hand, if an attempt is suppressed by a Contact type rule, the entire contact is suppressed, and no further escalation of that contact will occur in the sub-campaign.

Figure 11:
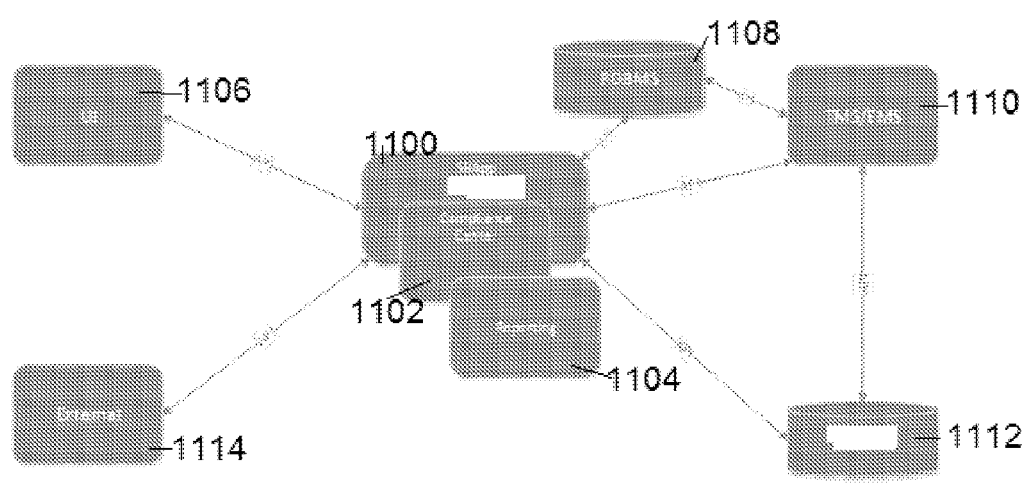
FIG. 11 illustrates a rules-based compliance system operative to enforce the configured rules during an outbound communications campaign.

FIG. 11 illustrates a representative embodiment of service provider architecture that is modified according to the techniques herein to provide a rules-based compliance system. In this embodiment, an outbound application (SBApp) 1100 executes with a compliance center component 1102, a reporting component 1104, user interface component (UI) 1106, relational database management system component (RDBMS) 1108, outbound call/message system (TMS/EMS) 1110, cache component 1112, and other external systems 1114. The UI was described above, e.g., in FIGS. 3-8. As has been described, UI component 1106 via SBApp application programming interface (API) 1116 creates "Contact Attempt" rules for an account. Also, the UI component 1106 via SBApp API 1116 creates and sends a SubCampaign after selecting rules for the SubCampaign under an account. The SBApp component 1100 dispatches the outbound SubCampaign's calls to the outbound call/message system (TMS/EMS) 1110. Also, on-demand calls are dispatched by different processes (e.g., Javascript, manual or schedule call backs) to TMS/EMS. Before placing the call on TMS or, sending email on EMS or sending text, rules of the SubCampaign and its account are evaluated using an internal API (manager). If a call should not be placed or sent because of rules, it is stored in the RDBMS 308 with appropriate completion status. This is used for reporting purposes. In parallel, TMS/EMS stores all call attempts in the cache 1112.

Contact attempt rules preferably have the following properties and characteristics. Rules are imported via import of XML. Rule(s) are downloaded in XML format. If a rule name with same name already exists, the old rule is deleted and the new rule is created with the same name. A warning is generated to the user that existing rule will be replaced. Rules can be modified dynamically. If a rule is modified when a sub-campaign is running, a warning is generated that modification of the rule will affect running sub-campaigns. Non-mandatory rules are available for selection on Campaign and Sub-Campaign. Mandatory rules by default selected for Campaign and SubCampaign and preferably cannot be modified. Non-mandatory rules selected for Campaign are carried over to SubCampaign and can be overridden on SubCampaign. Preferably, attributes of Contact Attempt Rule are: type (ClientId/Device), level (Enterprise/Account), required, numberOfAttempts, numberOfDays, postalCode, areaCode, stateCode, completionStatus, countryCodeOfContact, countryCodeOfDevice, timeZoneOfContact and timeZoneOfDevice. Valid fields of type ClientId are level, required, numberOfAttempts, numberOfDays, postalCode, stateCode, completionStatus, countryCodeOfContact and timeZoneOfContact. Valid fields of type Device are level, required, numberOfAttempts, numberOfDays, areaCode, stateCode, completionStatus, countryCodeOfDevice and timeZoneOfDevice. If there is more than one postalCode/areaCode/stateCode/completionStatus in a rule, a separate name/value pair is created.

Without intending to be limiting, preferably contact attempt rules look back over a given time period, e.g., up to 30 days.

As used herein, the "Compliance Manager" should be broadly construed to refer to machines, devices, processes, applications, utilities, software interfaces, display interfaces, configuration files, data structures and data, that facilitate one or more of the above-described functions and features.

The techniques described herein provide many advantages. The approach enables platform customers to manage compliance as new demands are imposed from various regulatory agencies (such as the FCC, FTC and CFPB in the United States, Ofcom and OFT in the United Kingdom, and CRTC in Canada, among others) are imposed. Using the rules-based approach described above, customers create strategies that enable contact center compliance, resulting in improved efficiencies, lower costs, more outreach opportunities, and greater collections success.

Other variants may also be implemented. Thus, for example, priority values for rules may be parameterized or conditional. There may be a predefined or configurable set of rules for different regulations. The interface may also include a mechanism to provide warnings or other notifications in the event a user attempts to modify a rule, or to define a rule that conflicts with a predefined rule, or the like. When multiple rules apply, the system may include a mechanism to resolve any rule conflicts and/or to alter the rule execution appropriately to address any such conflict. Typically, rule priority does not affect who is suppressed, although it may alter the nature of the reporting provided by the system. While the techniques herein refer to rules of exclusion that operate to provide suppression, the techniques may be practiced with "enabling" or permissive rules, namely, rules that operate to enable delivery when a default operation would say otherwise.

The technique may be implemented as a computer program, namely, as a set of computer program instructions executed by one or more data (hardware) processors.

As previously noted, the hardware and software systems in which the subject matter herein is illustrated are merely representative. The described functionality may be practiced, typically in software, on one or more machines. Generalizing, a machine typically comprises commodity hardware and software, storage (e.g., disks, disk arrays, and the like) and memory (RAM, ROM, and the like). The particular machines used in the network are not a limitation. A given machine includes network interfaces and software to connect the machine to a network in the usual manner. As illustrated in FIG. 1, the subject disclosure may be implemented as a managed service (e.g., in an software-as-a-service (SaaS) model) using the illustrated set of machines, which are connected or connectable to one or more networks. More generally, the service is provided by an operator using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g., Intel®-based) hardware, an operating system (e.g., Linux, Windows, OS-X, Android or the like), an application runtime environment (e.g., Java, .ASP), and a set of applications or processes (e.g., Java applets or servlets, linkable libraries, native code, or the like, depending on platform), that provide the functionality of a given system or subsystem. As described, the service may be implemented in a standalone server, or across a distributed set of machines. Typically, a server connects to the publicly-routable Internet, a corporate intranet, a private network, or any combination thereof, depending on the desired implementation environment.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While given components of the system have been described separately, one of ordinary skill will appreciate that some of the functions may be combined or shared in given instructions, program sequences, code portions, and the like.

Preferably, the functionality is implemented in an application layer solution, although this is not a limitation. The functionality may be implemented with application layer protocols such HTTP and HTTPS, or any other protocol having similar operating characteristics.

Having described our invention, what we now claim is set forth below.

The invention claimed is:

1. A system for managing contact center campaigns, the system comprising:
   a switch configured to receive a plurality of communications for routing to one or more communication devices;
   a processor; and
   a memory coupled to the processor, wherein the memory has stored thereon instructions that, when executed by the processor, causes the processor to:
      identify a plurality of contact suppression rules corresponding to an outbound campaign, each of the contact suppression rules defining a parameter for suppressing a contact attempt during the outbound campaign based at least partially on past contact attempts;
      identify a plurality of contacts corresponding to the outbound campaign;
      during the outbound campaign, determine whether any of the contact suppression rules is satisfied for a first contact and a second contact among the contacts by evaluating the contact suppression rules in order of priority, wherein the contact suppression rules comprise a first contact suppression rule having a first priority and a second contact suppression rule having a second priority, wherein the first priority is higher than the second priority;
      in response to the any of the contact suppression rules being satisfied for the first contact, suppress a contact attempt to the first contact; and
      in response to none of the contact suppression rules being satisfied for the second contact, transmit a signal to the switch for initiating a connection with an electronic device associated with the second contact.

2. The system of claim 1, wherein determining whether any of the contact suppression rules is satisfied is performed in real time during the outbound campaign.

3. The system of claim 1, wherein at least one of the contact suppression rules comprises a threshold number of the past contact attempts for suppressing the contact attempt.

4. The system of claim 1, wherein at least one of the contact suppression rules comprises a threshold number of the past contact attempts over a pre-configured time period for suppressing the contact attempt.

5. The system of claim 1, wherein at least one of the contact suppression rules comprises a pre-configured location corresponding to the contact for suppressing the contact attempt.

6. The system of claim 5, wherein the pre-configured location comprises at least one of a specified postal code, a specified area code, a device time zone, or a contact time zone.

7. The system of claim 1, wherein at least one of the first or second contact suppression rules corresponds to all of the contacts for the campaign.

8. The system of claim 1, wherein at least one of the first or second contact suppression rules correspond to the contact but not all of the contacts.

9. The system of claim 1, wherein the first contact suppression rule is an enterprise-level contact rule and the second contact suppression rule is an account-level contact rule.

10. The system of claim 1, wherein the first contact suppression rule is a contact location rule and the second contact suppression rule is a contact attempt rule.

11. A method for managing contact center campaigns, the method comprising:
   identifying, by a processor, a plurality of contact suppression rules corresponding to an outbound campaign, each of the contact suppression rules defining a parameter for suppressing a contact attempt during the outbound campaign based at least partially on past contact attempts;
   identifying, by the processor, a plurality of contacts corresponding to the outbound campaign;
   during the outbound campaign, determining, by the processor, whether any of the contact suppression rules is satisfied for a first contact and a second contact among the contacts by evaluating the contact suppression rules in order of priority, wherein the contact suppression rules comprise a first contact suppression rule having a first priority and a second contact suppression rule having a second priority, wherein the first priority is higher than the second priority;

in response to the any of the contact suppression rules being satisfied for the first contact, suppressing, by the processor, a contact attempt to the first contact; and in response to none of the contact suppression rules being satisfied for the second contact, transmitting, by the processor, a signal to a switch for initiating a connection with an electronic device associated with the second contact.

12. The method of claim 11, wherein determining whether any of the contact suppression rules is satisfied is performed in real time during the outbound campaign.

13. The method of claim 11, wherein at least one of the contact suppression rules comprises a threshold number of the past contact attempts for suppressing the contact attempt.

14. The method of claim 11, wherein at least one of the contact suppression rules comprises a threshold number of the past contact attempts over a pre-configured time period for suppressing the contact attempt.

15. The method of claim 11, wherein at least one of the contact suppression rules comprises a pre-configured location corresponding to the contact for suppressing the contact attempt.

16. The method of claim 15, wherein the pre-configured location comprises at least one of a specified postal code, a specified area code, a device time zone, or a contact time zone.

17. The method of claim 11, wherein at least one of the first or second contact suppression rules corresponds to all of the contacts for the campaign.

18. The method of claim 11, wherein at least one of the first or second contact suppression rules correspond to the contact but not all of the contacts.

19. The method of claim 11, wherein the first contact suppression rule is an enterprise-level contact rule and the second contact suppression rule is an account-level contact rule.

20. The method of claim 11, wherein the first contact suppression rule is a contact location rule and the second contact suppression rule is a contact attempt rule.

* * * * *